(12) United States Patent
Bullock et al.

(10) Patent No.: US 6,515,485 B1
(45) Date of Patent: Feb. 4, 2003

(54) METHOD AND SYSTEM FOR POWER LINE IMPEDANCE DETECTION AND AUTOMATIC IMPEDANCE MATCHING

(75) Inventors: Scott R. Bullock, South Jordan, UT (US); Ryan Hoobler, West Valley City, UT (US)

(73) Assignee: Phonex Broadband Corporation, Midvale, UT (US)

( * ) Notice: Subject to any disclaimer, the term of this patent is extended or adjusted under 35 U.S.C. 154(b) by 0 days.

(21) Appl. No.: 09/552,513

(22) Filed: Apr. 19, 2000

(51) Int. Cl.$^7$ .................. G01R 35/00; H04M 11/04; H04M 9/00
(52) U.S. Cl. .................. 324/601; 340/310.05; 379/394
(58) Field of Search .................. 324/601, 607, 324/616, 627, 628, 663; 340/310.05; 379/394, 397, 398

(56) References Cited

U.S. PATENT DOCUMENTS

| | | | |
|---|---|---|---|
| 3,810,096 A | 5/1974 | Kabat et al. | 340/534 |
| 5,349,644 A | 9/1994 | Massey et al. | 395/200 |
| 5,402,073 A * | 3/1995 | Ross | 324/616 |
| 5,465,287 A * | 11/1995 | Egozi | 324/663 |
| 5,559,440 A * | 9/1996 | Lopresti et al. | 324/607 |
| 5,869,909 A | 2/1999 | Silverberg et al. | 307/89 |
| 5,949,327 A | 9/1999 | Brown | 340/310.01 |

* cited by examiner

Primary Examiner—Christine Oda
Assistant Examiner—J Kerveros
(74) Attorney, Agent, or Firm—Lloyd W. Sadler

(57) ABSTRACT

A system and method for the automatic detection and matching of power line impedance which makes use of level detection and source impedance circuits in electronic communication with the existing circuitry of a power line communication devices are disclosed. This invention uses modified power line communication device circuitry to sense the impedance of the power line and to correct its impedance to match the impedance of the power line. By automatically sensing and adjusting the source impedance of the power line jack this invention maximizes power transfer to and from the power line, reduces radiated power as well as the power line reflection coefficient.

3 Claims, 3 Drawing Sheets

METHOD AND SYSTEM FOR POWER LINE IMPEDANCE DETECTION AND AUTOMATIC IMPEDANCE MATCHING

BACKGROUND OF THE INVENTION

1. Field of the Invention

This invention relates to the transmission of communication signals over the AC power line. More particularly, this invention relates to the sensing and matching of the impedance of the power line to maximize signal power transfer while minimizing the radiated power.

2. Description of the Related Art

A variety of techniques have been proposed to address the problem of the variability of power line impedance in communications systems. Generally these techniques use power-conditioning circuits to attempt to adjust the power characteristics to specific desired values. The approach of this invention is to sense the impedance of the power line and to actively adjust the transmitter and receiver connected to the power line to match the power line impedance.

For general background material the reader is directed to the following U.S. patents each of which is incorporated in its entirety for the material contained therein.

U.S. Pat. No. 3,810,096 describes a method and system for transmitting data and indicating room status that has a transmitter and a receiver utilizing the neutral and ground lines of a conventional AC room power line as a communications link.

U.S. Pat. No. 5,349,644 describes a distributed artificial intelligence data acquisition and equipment control system that uses an AC power line to form a local area network.

U.S. Pat. No. 5,869,909 describes a ground voltage reduction device that is connected between a neutral reference node and a ground node defined by two bypass capacitors of a blocking circuit.

U.S. Pat. No. 5,949,327 describes an overhead balanced power distribution network that is coupled to telecommunications signals.

SUMMARY OF THE INVENTION

It is desirable to provide a method and system for the determination and matching of power line impedance, which such power line is used as a communication channel. Moreover, it is desirable to provide a method and system that provides maximum signal power transfer to and from the power line for both transmitting and receiving communication signals. Further it is desirable to provide a method and system that minimizes the signal power radiated off the power line and minimizes the reflection coefficient of the power line.

Therefore, it is the general object of this invention to provide a method and system for determining the impedance of a power line which is being used as a communication channel.

It is also an object of this invention to provide a method and system for matching the output impedance of the signal transmitter to the power line impedance.

It is a further object of this invention to provide a method and system for matching the input impedance of a receiver to the power line impedance.

Another object of this invention to match input and output impedance of the receiver and the transmitter to the power line as frequently or infrequently as required.

These and other objects of this invention are achieved by the method and system herein described and are readily apparent to those of ordinary skill in the art upon careful review of the following drawings, detailed description and claims.

BRIEF DESCRIPTION OF THE DRAWINGS

In order to show the manner that the above recited and other advantages and objects of the invention are obtained, a more particular description of the preferred embodiment of the invention, which is illustrated in the appended drawings, is described as follows. The reader should understand that the drawings depict only preferred embodiments of the invention, and are not to be considered as limiting in scope. A brief description of the drawings is as follows.

DETAILED DESCRIPTION OF THE INVENTION

This invention is a system and method for detecting and matching impedance in a power line communication channel, to provide maximum power transfer to and from the power line for both transmission and reception of the communication signal, as well as minimizing the radiated power off the power lien and the reflection coefficient. Essentially, this invention uses circuitry and a method incorporated in a power line phone jack to sense the impedance of the power line and correct the input and/or output stages of the power line interface to match the impedance of the power line. The method of this invention can be done as frequently or infrequently as needed, for example, the transceiver connected to the power line can sense and match the power line impedance only when first plugged in or many times per power line cycle.

Figure 1:
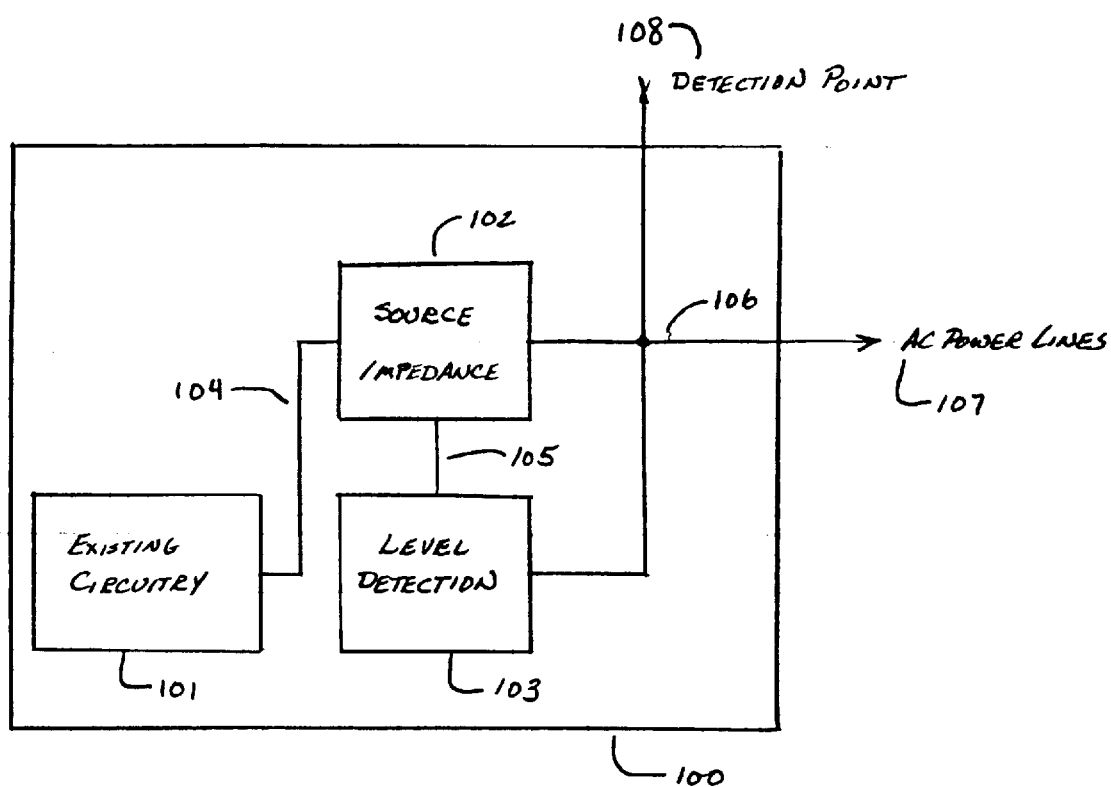
FIG. 1 is a top-level block diagram of the preferred impedance matching system of this invention.

FIG. 1 shows a top-level block diagram of the preferred impedance matching system of this invention. The automatic power line impedance matching of this invention is preferably built into a standard power line telephone jack 100. The existing jack circuitry 101 is electrically 104 connected to an adjustable source impedance circuit 102, the output of which is connected to the AC power line 108. Typically the preferred source impedance circuit 102 is a voltage adjustable series resistor. The AC power line 108 is provided with a detection point 107 where the signal level can be measured. The AC power line 108 is also connected to the line detection circuit 103 where the power line impedance detection is performed. The power line level detection circuit 103 communicates 105 the desired impedance for matching to the source impedance circuit 102. One preferred method of controlling the variable resistance of the source impedance 102 is to use a transistor as the variable resistor of the source impedance 102, similar to an automatic gain control circuit, well known in the art. The transistor is controlled by the value of the signal at the output of the source impedance 102. The best and preferred impedance match is accomplished when the voltage level measured at the output of the source impedance 102 is equal to ½ of the voltage on the input to the series resistor of the source impedance 102. This means that the best match is achieved when the source impedance 102 and the load impedance of the telephone line 108 is equal.

Figure 2:
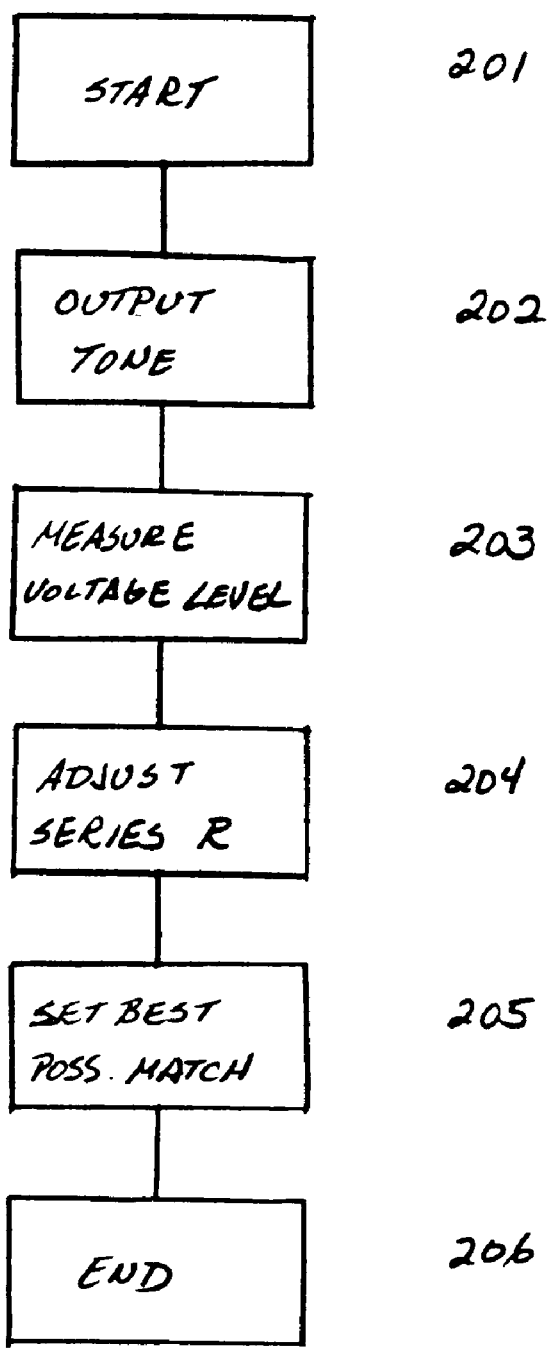
FIG. 2 a process flow chart for a first preferred method of this invention.

FIG. 2 shows a process flow chart for a first preferred method of this invention. This preferred method starts 201 by outputting 202 a tone. The voltage level is measured 203 at the output of the source impedance 102 to the power line 108 and the series resistance is adjusted 204 to give the match. The best possible match is set 205, completing the adjustment of the series resistance ends 206 this preferred embodiment of the process.

Figure 3:
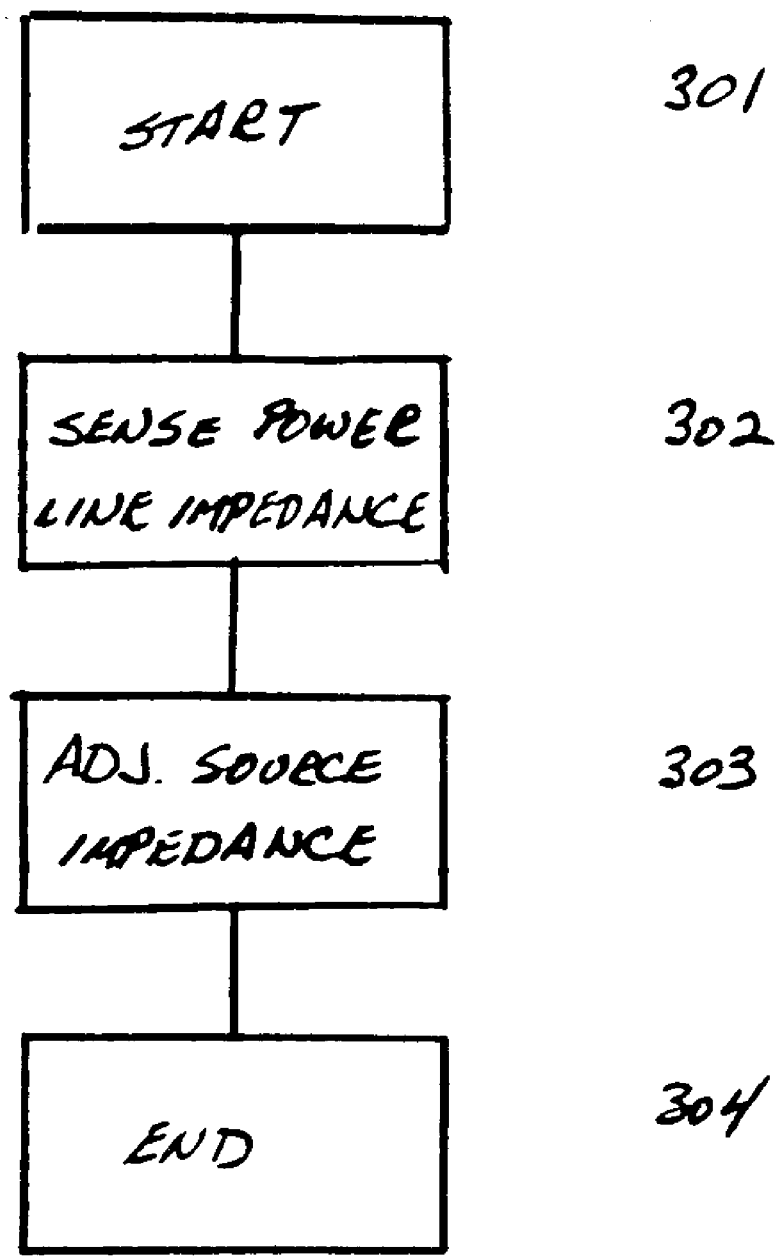
FIG. 3 is a process flow chart for a second preferred method of this invention.

FIG. 3 shows a process flow chart for a second automatic preferred method of this invention. In this embodiment, the process starts 301 with the sensing 302 of the AC power line impedance. Then the variable resistance of the source impedance 102 is adjusted 303. Once the source impedance 102 is adjusted the process ends 304.

The described embodiments are to be considered in all respects only as illustrative and not as restrictive. Although the embodiments shown here use particular components and order of steps, the invention is not limited thereto. The scope of this invention is indicated by the appended claims rather than by the foregoing description, which is provided to describe the best mode of the invention envisioned by the inventors. All changes that come within the meaning and range of equivalency of the claims are to be embraced as being within their scope.

We claim:

1. A system for detecting and matching power line impedance, comprising:

(A) an AC power line communication device having an existing AC power line connection circuitry;

(B) a source impedance circuit, connected to said existing AC power line connection circuitry of said communication device;

(C) a level detection circuit electrically connected to said source impedance circuit; and (D) an AC power line connected to said source impedance circuit and said level detection circuit, said AC power line providing a power line communication channel.

2. A method for detecting and matching power line impedance, comprising:

(A) outputting a tone;

(B) measuring a voltage level at the output of a source impedance connected to an AC power line; and (C) adjusting the output impedance to match an AC power line communication channel impedance.

3. A method for detecting and matching power line impedance, comprising:

(A) sensing the impedance of an AC power line communication channel; and (B) adjusting a variable resistance to reduce the signal level at a source resistor to ½ its previous level.

* * * * *